(12) United States Patent
Cheng et al.

(10) Patent No.: US 11,475,700 B2
(45) Date of Patent: Oct. 18, 2022

(54) SIGNAL COLLECTING CIRCUIT, SIGNAL COLLECTING METHOD AND ELECTRONIC DEVICE

(71) Applicant: BEIJING XIAOMI MOBILE SOFTWARE CO., LTD., Beijing (CN)

(72) Inventors: Chihjen Cheng, Beijing (CN); Yue Wang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/241,710

(22) Filed: Apr. 27, 2021

(65) Prior Publication Data

US 2022/0043994 A1 Feb. 10, 2022

(30) Foreign Application Priority Data

Aug. 6, 2020 (CN) .......................... 202010784830.3

(51) Int. Cl.
*G06V 40/13* (2022.01)
*H04N 5/369* (2011.01)

(52) U.S. Cl.
CPC ....... *G06V 40/1318* (2022.01); *H04N 5/3692* (2013.01)

(58) Field of Classification Search
None
See application file for complete search history.

(56) References Cited

U.S. PATENT DOCUMENTS

| 10,325,131 B2 | 6/2019 | Akhavan et al. |
| 2014/0266118 A1 | 9/2014 | Chern et al. |
| 2018/0225547 A1* | 8/2018 | Kim .................. G06V 40/1318 |
| 2020/0134281 A1* | 4/2020 | Han .................. G06V 40/1318 |
| 2020/0258448 A1* | 8/2020 | Hargreaves .......... G09G 3/3208 |

FOREIGN PATENT DOCUMENTS

| CN | 110163172 A | 8/2019 |
| EP | 2631898 A1 | 8/2013 |
| KR | 100803514 B1 | 2/2008 |
| TW | 201019657 A | 5/2010 |

OTHER PUBLICATIONS

European Patent Application No. 21170916.7 extended Search and Opinion dated Oct. 25, 2021, 8 pages.

* cited by examiner

*Primary Examiner* — Joseph R Haley
(74) *Attorney, Agent, or Firm* — Lathrop GPM LLP

(57) ABSTRACT

The present disclosure provides a signal collecting circuit, a signal collecting method and an electronic device. A signal collecting circuit includes: a bias voltage wire, multiple fingerprint pixel circuits and a photocurrent collecting module. Each fingerprint pixel circuit includes a photoelectric conversion unit connected to the bias voltage wire and configured to output a photocurrent signal to the bias voltage wire when light hits the photoelectric conversion unit. A photocurrent collecting module is connected to the bias voltage wire and configured to collect the photocurrent signals output by at least part of the photoelectric conversion unit through the bias voltage wire.

20 Claims, 7 Drawing Sheets

SIGNAL COLLECTING CIRCUIT, SIGNAL COLLECTING METHOD AND ELECTRONIC DEVICE

CROSS REFERENCE TO RELATED APPLICATION

This application is based on and claims priority to Chinese patent application No. 202010784830.3, filed on Aug. 6, 2020, the content of which is incorporated herein by reference.

TECHNICAL FIELD

The present disclosure relates to a field of electronic device technologies, and particularly to a signal collecting circuit, a signal collecting method and an electronic device.

BACKGROUND

With rapid development of display screen technologies, full screens are becoming more and more popular among users. In order to meet requirements of the users, manufacturers propose multiple schemes to increase a screen-to-body ratio, for example, an optical fingerprint detecting module may be provided under a screen to achieve fingerprint detecting under screen technologies. And, an area of the optical fingerprint detecting module may be enlarged to meet large-area fingerprint identification.

SUMMARY

The present disclosure provides a signal collecting circuit, a signal collecting method and an electronic device.

In a first aspect, the present disclosure provides a signal collecting circuit. The circuit includes: a bias voltage wire; multiple fingerprint pixel circuits, in which each fingerprint pixel circuit includes a photoelectric conversion unit connected to the bias voltage wire and configured to output a photocurrent signal to the bias voltage wire when light hits the photoelectric conversion unit; and a photocurrent collecting module, connected to the bias voltage wire, and configured to collect the photocurrent signal output by at least part of the photoelectric conversion units through the bias voltage wire.

In a second aspect, the present disclosure provides a signal collecting method, which is applied to a signal collecting circuit, in which the circuit includes a bias voltage wire, multiple fingerprint pixel circuits and a photocurrent collecting module, each of the fingerprint pixel circuits includes a photoelectric conversion unit, and the photoelectric conversion unit and the photoelectric collecting module are connected to the bias voltage wire. The method includes: outputting, by each photoelectric conversion unit, a photocurrent signal to the bias voltage wire when light hits the photoelectric conversion unit; collecting by a photocurrent collecting module, photocurrent signals output by at least part of the photoelectric conversion units through the bias voltage wire.

In a third aspect, the present disclosure provides an electronic device. The electronic device includes a display screen and a signal collecting circuit. The signal collecting circuit includes: a bias voltage wire; a plurality of fingerprint pixel circuits, each fingerprint pixel circuit comprising a photoelectric conversion unit, connected to the bias voltage wire and configured to output a photocurrent signal to the bias voltage wire when light hits the photoelectric conversion unit; and a photocurrent collecting module, connected to the bias voltage wire and configured to collect the photocurrent signals output by at least part of the photoelectric conversion units through the bias voltage wire.

DETAILED DESCRIPTION

Figure 1:
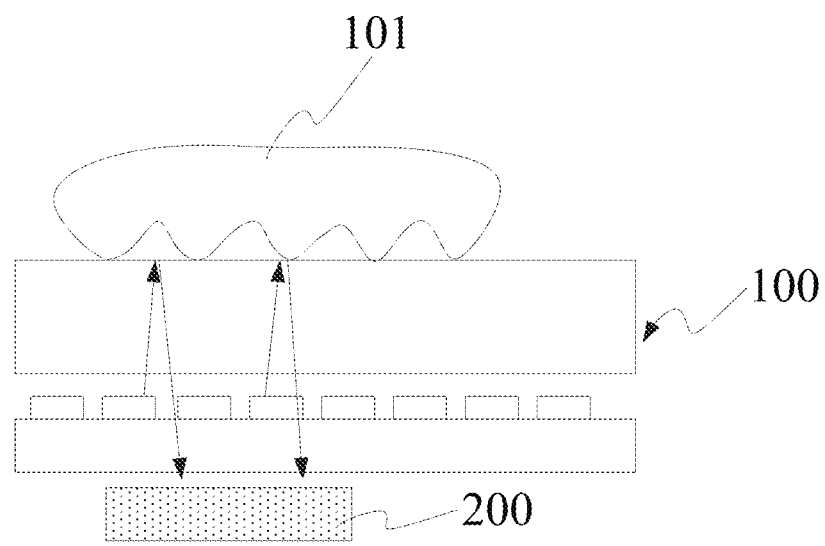
FIG. 1 is a diagram illustrating a local structure of an electronic device according to an exemplary embodiment of the present disclosure.

The exemplary embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

The terms described in the present disclosure are only for the purpose of describing specific embodiments and are not intended to limit the present disclosure. Unless otherwise defined, the technical terms or scientific terms used in the present disclosure shall be a common meaning understood by those skilled in the art of the present disclosure. A "first", "second" or similar words used in the present summary and the appended claims do not imply any order, quantity, or importance, but are configured only to distinguish different components. Similarly, "one", "a" and other similar words do not represent quantity limitation, but represents at least one. Unless otherwise stated, "including" or "comprising" and other similar words mean that the components or objects before "including" or "comprising" cover the components or objects and their equivalents listed after "including" or "comprising", not excluding other components or objects. Similar words such as "connected to" or "connected with" are not limited to physical or mechanical connections, and may include electrical connections, no matter direct or indirect.

The singular forms "a", "the" and "said" used in the disclosure and the appended claims are also intended to include plural forms, unless the context clearly indicates otherwise. It should also be understood that the term "and/or" used in the present disclosure means and includes any or all possible combinations of one or more associated listed items.

In some embodiments, an optical fingerprint detecting module may be provided under a screen to achieve fingerprint detecting under screen technologies. An area of the optical fingerprint detecting module may be enlarged to enlarge an area of fingerprint identification and improve user experience. However, cost of the optical fingerprint detecting module is increased, cost of an electronic device is further increased, and the optical fingerprint detecting module is only configured to detect a fingerprint. Therefore, utilization rates of the optical fingerprint detecting modules are low.

In order to increase the utilization rate of the optical fingerprint detecting module and market competitiveness of the electronic device, the present disclosure provides a signal collecting circuit, a signal collecting method and an electronic device, which is illustrated in combination with the attached figures as follows.

An electronic device provided in some embodiments of the present disclosure includes a signal collecting circuit, and the circuit may be configured to collect a photocurrent signal, and the photocurrent signal is configured to determine a light intensity. The circuit may be further configured to read fingerprint signals, and the fingerprint signals are configured to detect a fingerprint.

FIG. 1 is a diagram illustrating a local structure of an electronic device according to an exemplary embodiment of the present disclosure. Referring to FIG. 1, the electronic device includes a display screen 100, and the display screen 100 includes a front and a back. The front is configured to be touched by a finger 101, and the back of the display screen 100 is provided with a signal collecting circuit 200. Thus, fingerprint detecting under screen technologies may be achieved, and photocurrent signals collected by the signal collecting circuit 200 may be utilized to determine the light intensity of the display screen 100.

Figure 2:
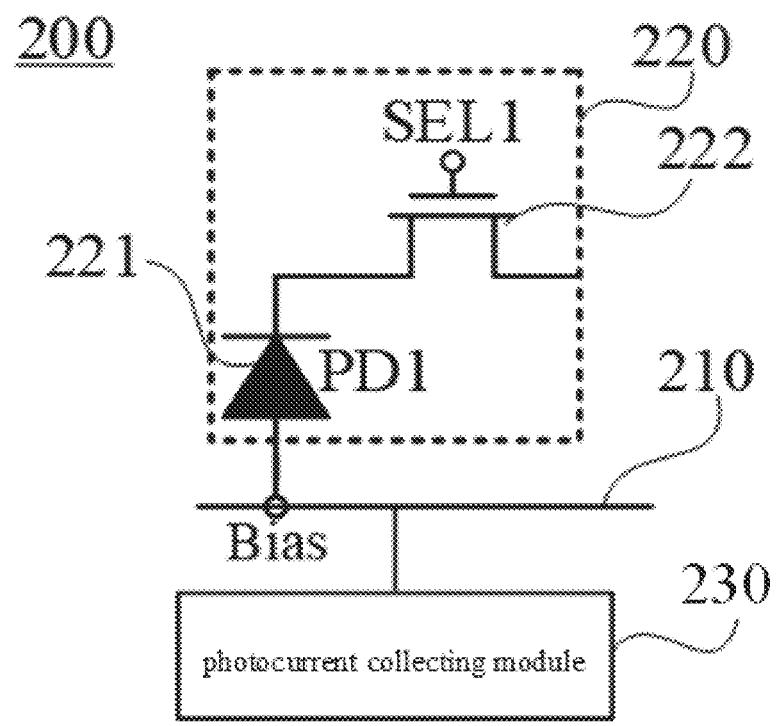
FIG. 2 is a diagram illustrating a local circuit of a signal collecting circuit according to an exemplary embodiment of the present disclosure.
Figure 3:
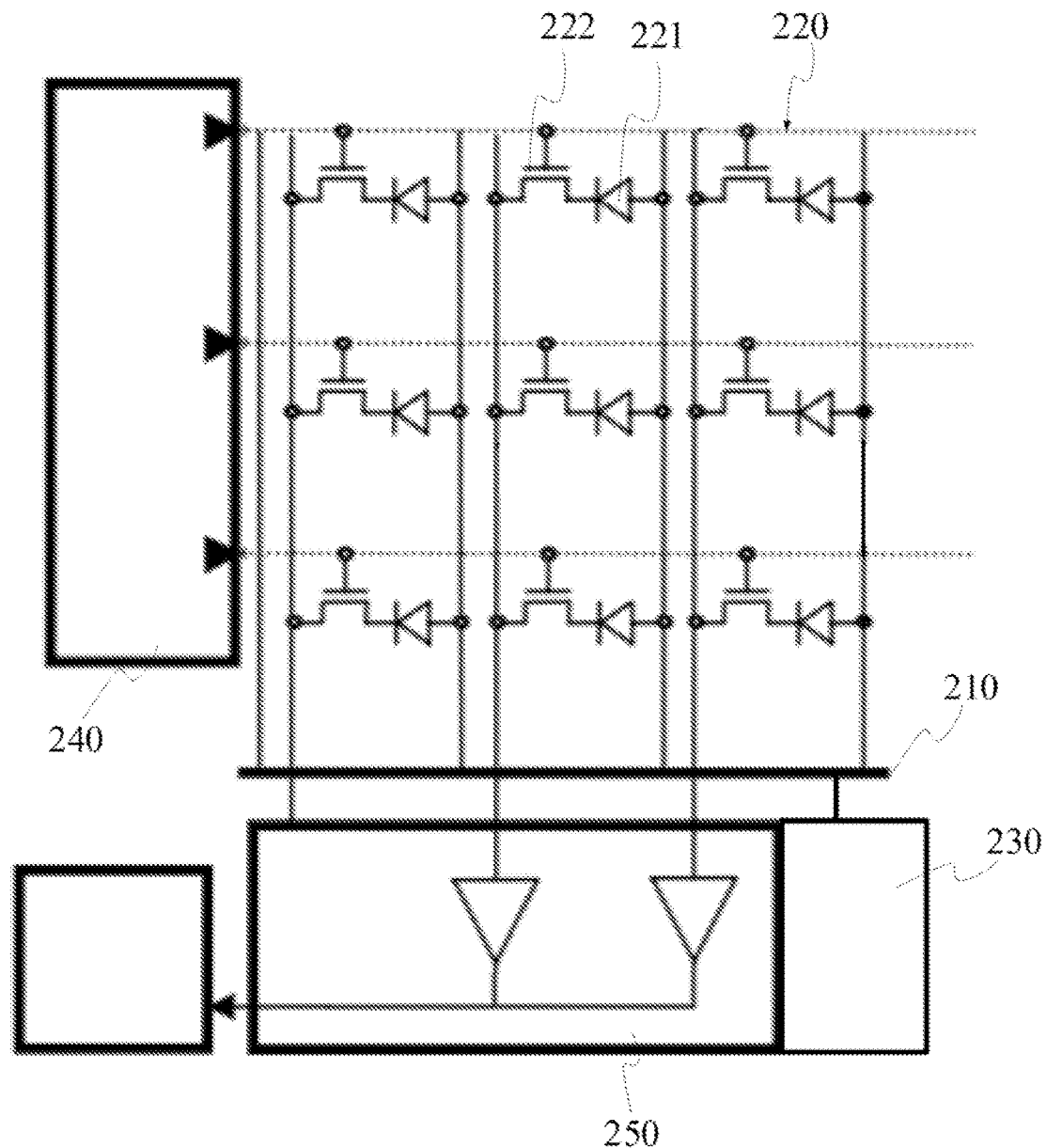
FIG. 3 is a diagram illustrating a signal collecting circuit according to an exemplary embodiment of the present disclosure.

FIG. 2 is a diagram illustrating a local circuit of a signal collecting circuit 200 according to an exemplary embodiment of the present disclosure. FIG. 3 is a diagram illustrating a circuit of a signal collecting circuit 200 according to an exemplary embodiment of the present disclosure. Referring to FIG. 2 and FIG. 3, the signal collecting circuit 200 includes: a bias voltage wire 210, multiple fingerprint pixel circuits 220 and a photocurrent collecting module 230.

Each fingerprint pixel circuit 220 includes a photoelectric conversion unit 221, and the photoelectric conversion unit 221 is connected to the bias voltage wire 210, and configured to output a photocurrent signal to the bias voltage wire 210 when light hits the photoelectric conversion unit. The photoelectric conversion unit 221 is configured to convert a light signal to a photocurrent signal and determine a light intensity according to the photocurrent signal. As an example, the photoelectric conversion unit 221 includes a photosensitive diode or a photosensitive triode. The bias voltage wire 210 is configured to provide a bias voltage for the photoelectric conversion unit 221 to enable the photoelectric conversion unit 221 to operate.

Figure 4:
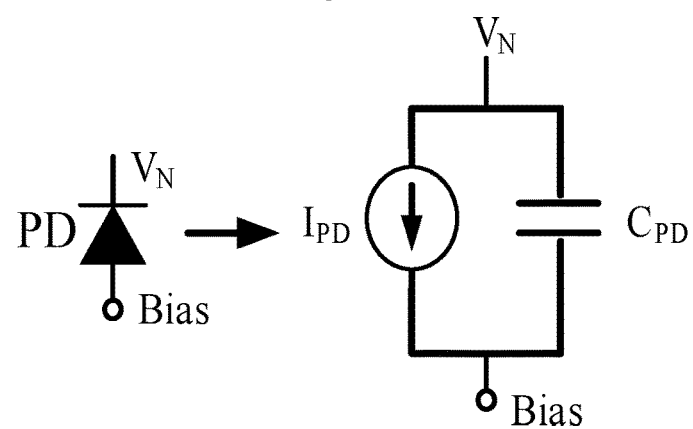
FIG. 4 is a diagram illustrating an equivalent circuit of a photosensitive diode according to an exemplary embodiment of the present disclosure.

FIG. 4 is a diagram illustrating an equivalent circuit of a photosensitive diode according to an exemplary embodiment of the present disclosure. Taking a photosensitive diode as an example, referring to FIG. 4, a photosensitive diode PD may be equivalent to a parallel conductor and a capacitor $C_{PD}$. The bias voltage wire 210 is connected to an anode of the photosensitive diode PD, a voltage VN of an anode of the photosensitive diode PD is greater than a voltage of the cathode of the photosensitive diode PD supplied by the bias voltage wire 210 (a voltage at a bias connection point Bias). The bias voltage wire 210 may be with a fixed direct voltage, so that the photosensitive diode PD operates in a reverse bias region. Generally, when no light hits the photoelectric conversion unit, a reverse resistance of the photosensitive diode PD is very large; when light hits the photoelectric conversion unit, the reverse resistance of the photosensitive diode PD decreases, and a photocurrent signal $I_{PD}$ generated by the photosensitive diode PD flows to the anode of the photosensitive diode PD from the cathode of the photosensitive diode PD, that is, the photosensitive diode PD outputs the photocurrent signal $I_{PD}$ to the bias voltage wire 210. The photosensitive triode also operates in a reverse bias region. Operating principle of the photosensitive triode is similar to that of the photosensitive diode. When the light hits the photoelectric conversion unit, a photocurrent signal of a photosensitive triode outputs to the bias voltage wire, which will not be described in detail here.

A photocurrent collecting module 230 is connected to the bias voltage wire 210 and configured to collect the photocurrent signals output by at least part of the photoelectric conversion units 221 through the bias voltage wire 210.

With the signal collecting circuit 200 provided in the embodiment of the present disclosure, since the photoelectric conversion units 221 and the photoelectric collecting module 230 are connected to the bias voltage wire 210, each photoelectric conversion unit 221 outputs the photocurrent signal to the bias voltage wire 210 when light hits the photoelectric conversion unit, and the photocurrent collecting module 230 collects the photocurrent signals output by the bias voltage wire 210, to determine the light intensity based on the photocurrent signals. Thus, a fingerprint pixel circuit 220 is multiplexed to detect the light intensity to improve the utilization rate of the fingerprint pixel circuit 220, so that the electronic device including the signal collecting circuit 200 has a light intensity detection function and a fingerprint detection function, which is conducive to increasing the market competitiveness of the electronic device. In addition, an original hardware for detecting the light intensity in the electronic device may be omitted, and the fingerprint pixel circuit 220 may be multiplexed to detect the light intensity, which is conducive to reducing cost of the electronic device.

Figure 5:
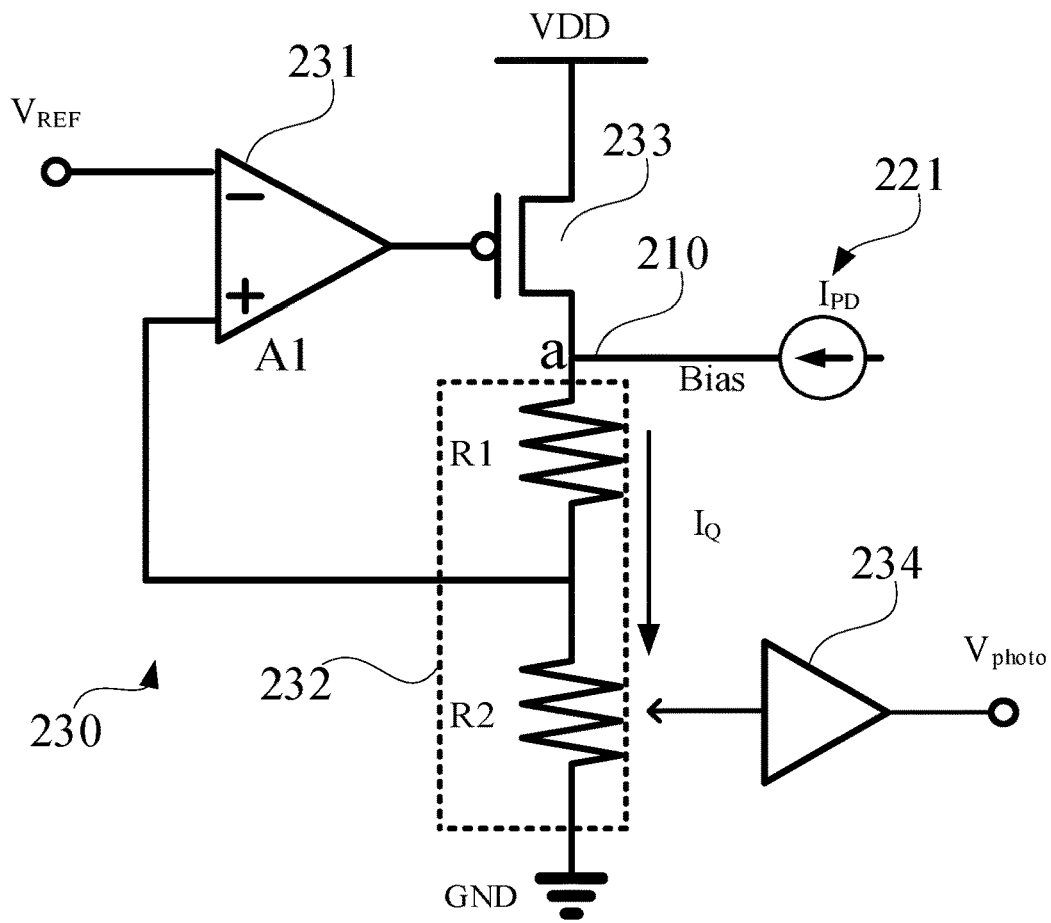
FIG. 5 is a diagram illustrating a circuit of a photocurrent collecting module connecting to a photoelectric conversion unit according to an exemplary embodiment of the present disclosure.

Since it is required to stably supply power to the photoelectric conversion unit 22 land detect the photocurrent signal through the bias voltage wire 210, the voltage of the biased voltage wire 210 requires to be stabilized. Thus, a circuit structure of the photocurrent collecting module 230 in the present disclosure is given in the following two types of embodiments:

FIG. 5 is a diagram illustrating a circuit of a photocurrent collecting module 230 connecting to a photoelectric conversion unit 221 according to an exemplary embodiment of the present disclosure. In a first type of embodiment, as illustrated in FIG. 5, the photocurrent collecting module 230 includes a power supply terminal VDD, a feedback circuit 231, a voltage division circuit 232 and a voltage regulator 233. The voltage regulator 233 includes a control terminal, a first connection terminal and a second connection terminal, the control terminal is connected to the feedback circuit 231, the first connection terminal is connected to a power supply terminal VDD, and the second connection terminal is connected to the voltage division circuit 232. The voltage division circuit 232 is connected to a grounding terminal GND and the feedback circuit 231. A bias voltage point a between the second connection terminal and the feedback circuit 231 is connected to the bias voltage wire 210. The voltage division circuit 232 is configured to divide a voltage at the bias voltage point a to obtain a feedback voltage, and the feedback circuit 231 is configured to output a voltage regulating signal to the voltage regulator 233 based on the feedback voltage to enable the voltage regulator 233 to adjust a voltage at the second connection terminal, to stabilize the voltage of the bias voltage point a, which is conductive to providing the stable bias voltage for the photoelectric conversion unit 221 by the bias voltage wire 210 and stably collecting the photocurrent signals through the bias voltage wire 210. The photocurrent collecting module 230 has good voltage stabilization effect, and may collect the photocurrent signals output by a larger number of the photoelectric conversion units 221.

In some embodiments, referring to FIG. 5, the voltage division circuit 232 includes a first voltage division resistor R1 and a second voltage division resistor R2 connected in series. The first voltage division resistor R1 is connected to the second connection terminal, and the second voltage division resistor R2 is connected to the grounding terminal GND; one terminal of the feedback circuit 231 is connected a first point between the first voltage division resistor R1 and the second voltage division resistor R2. Thus, the voltage of the bias voltage point a is divided through the voltage division circuit 232 to obtain the feedback voltage Va*R1/(R1+R2).

In some embodiments, referring to FIG. 5, the photocurrent collecting module 230 further includes a first reference voltage terminal $V_{REF}$, and the feedback circuit 231 includes a first operational amplifier A1. The first operational amplifier A1 includes a first input terminal, a second input terminal, and a first output terminal. The first input terminal is connected to the first reference voltage terminal $V_{REF}$, the second input terminal is connected the first point between the first voltage division resistor R1 and the second voltage division resistor R2, and the first output terminal is connected to the control terminal of the voltage regulator 233. The second input terminal of the first operational amplifier A1 receives a feedback voltage obtained by dividing the voltage of the bias voltage point a by the voltage divider circuit 232, the first input terminal receives a first reference voltage, and the first operational amplifier A1 outputs the voltage regulating signal to the control terminal of the voltage regulator 233 based on the feedback voltage and the first reference voltage, to control the voltage regulator 233 to regulate the voltage of the bias voltage point a. As an example, the first input terminal is a negative input terminal, and the second input terminal is a positive input terminal.

In some embodiments, the voltage regulator 233 includes a transistor, and the transistor includes a grid, a first connection terminal and a second connection terminal, and the grid is connected to the feedback circuit 231. As an example, the transistor is a P type transistor, the control terminal is a gate, the first connection terminal is a source connected to the power supply terminal VDD, the second connection terminal is a drain connected to the voltage division circuit 232. The transistor regulates a voltage drop based on the voltage regulating signal fed back by the feedback circuit 231, to stabilize the voltage of the bias voltage point a.

As an example, the first input terminal of the first operational amplifier A1 is the negative input terminal, and the second input terminal is the positive input terminal, the voltage regulator 233 is the P type transistor, and the voltage division circuit 232 includes the first voltage division resistor R1 and the second voltage division resistor R2. When the voltage of the bias voltage point a increases, the voltage of the first voltage division resistor R1 by dividing the bias voltage point a increases, the first operational amplifier A1 obtains an increased feedback voltage, and the first operational amplifier A1 outputs the voltage regulating signal to the transistor, to increase the voltage of the gate and decrease the voltage of the drain, thereby stabilizing the voltage at the bias voltage point a. Correspondingly, when the voltage of the bias voltage point a decreases, the voltage of the first voltage division resistor R1 by dividing the bias voltage point a decreases, the first operational amplifier A1 obtains a decreased feedback voltage, and the first operational amplifier A1 outputs the voltage regulating signal to the transistor, to decrease the voltage of the gate and increase the voltage of the drain, thereby stabilizing the voltage at the bias voltage point a.

In some embodiments, referring to FIG. 5, the photocurrent collecting module 230 further includes a voltage detector 234. The voltage detector 234 is configured to detect a voltage of the second voltage division resistor R2. As an example, the voltage of the second voltage division resistor R2 is detected twice by the voltage detector 234, and then a voltage difference may be obtained by other processing modules, and a variation quantity of the photocurrent signal is determined according to the voltage difference, and then the light intensity is determined according to the variation quantity of the photocurrent signal. As an example, the voltage detector 234 may detect a voltage of a partial resistance of the second voltage division resistor R2.

Figure 6:
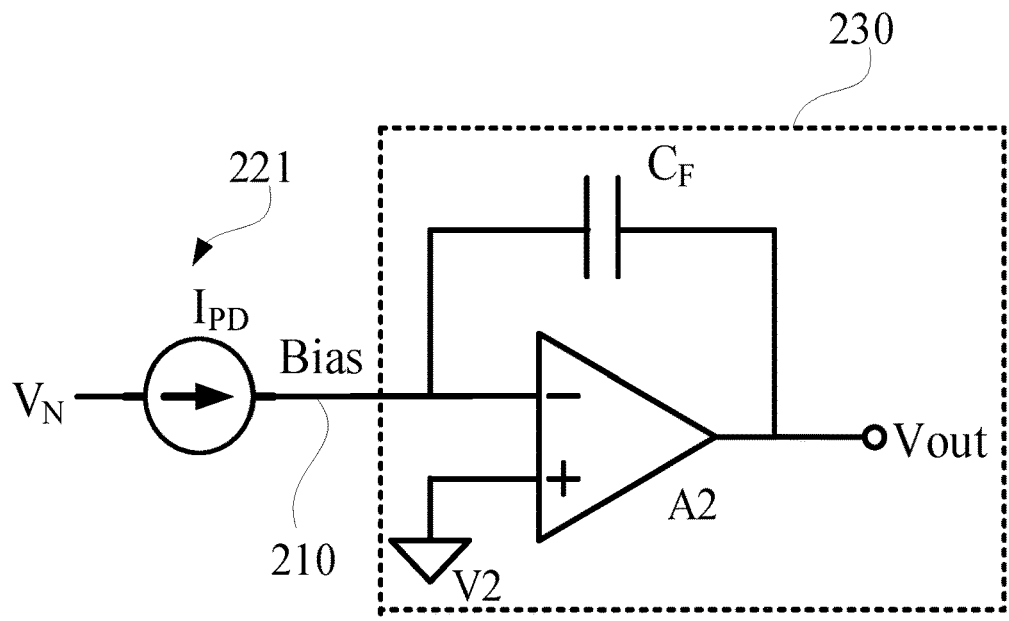
FIG. 6 is a diagram illustrating a circuit of a photocurrent collecting module connecting to a photoelectric conversion unit according to an exemplary embodiment of the present disclosure.

FIG. 6 is a diagram illustrating a circuit of a photocurrent collecting module 230 connecting to a photoelectric conversion unit 221 according to an exemplary embodiment of the present disclosure. In a second type of embodiments, referring to FIG. 6, the photocurrent collecting module 230 includes a second operational amplifier A2, a feedback capacitor CF and a second reference voltage terminal V2. The second operational amplifier A2 includes a third input terminal, a fourth input terminal and a second output terminal. The third input terminal is connected to the second reference voltage terminal V2, the fourth input terminal is connected to an output terminal of the bias voltage wire 210. One terminal of the feedback capacitor CF is connected to the fourth input terminal and the other terminal of the feedback capacitor CF is connected to the second output terminal. The feedback capacitor CF may feedback a voltage signal output by the second operational amplifier A2 to the bias voltage wire 210, to stabilize the voltage of the bias voltage wire 210. The photocurrent collecting module 230 has a simple structure, and may collect the photocurrent signals output by a relatively small number of the photoelectric conversion units 221.

Figure 7:
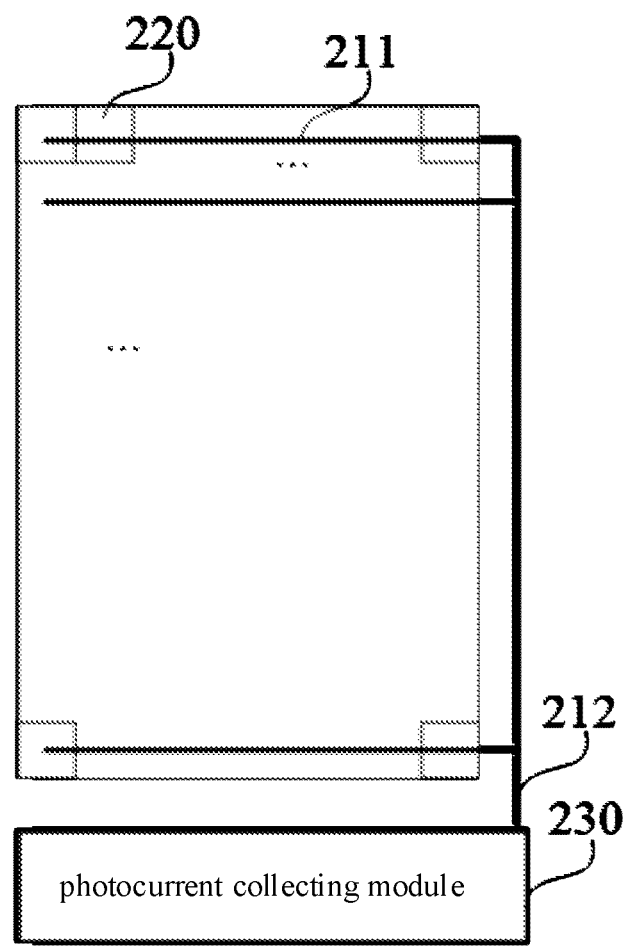
FIG. 7 is a diagram illustrating a local layout of a signal collecting circuit according to an exemplary embodiment of the present disclosure.

FIG. 7 is a diagram illustrating a local layout of a signal collecting circuit 200 according to an exemplary embodiment of the present disclosure. In some embodiments, referring to FIG. 7, the bias voltage wire 210 includes multiple bias voltage branches 211 and a bias voltage bus 212. The output terminal of each bias voltage branches 211 is connected to an input terminal of the bias voltage bus 212, and an output terminal of the bias voltage bus 212 is connected to the photocurrent collecting module 230. Multiple fingerprint pixel circuits 220 are provided in multi-rows and multi-columns. The photoelectric conversion units 221 in each row of the fingerprint pixel circuits 220 are connected to the input terminal of one bias voltage branch 211, or the photoelectric conversion units 221 in each column of the fingerprint pixel circuits 220 are connected to the input terminal of one bias voltage branch 211. It is understandable that all the photoelectric conversion units 221 corresponding to the fingerprint pixel circuits 220 are connected to the bias voltage bus 212, so that the photocurrent signal obtained by the bias voltage bus 212 is a sum of the photocurrent signals output by all the photoelectric conversion units 221. In this way, the light intensity of the display screen 100 may be determined through the photocurrent signal obtained by the photocurrent collecting module 230, without separately setting other additional photocurrent signals summing circuits. Detecting the light intensity of the entire display screen, compared to detecting the local light intensity of the display screen by specially setting the light intensity detecting module, is conductive to improving an accuracy of detecting the light intensity.

Figure 8:
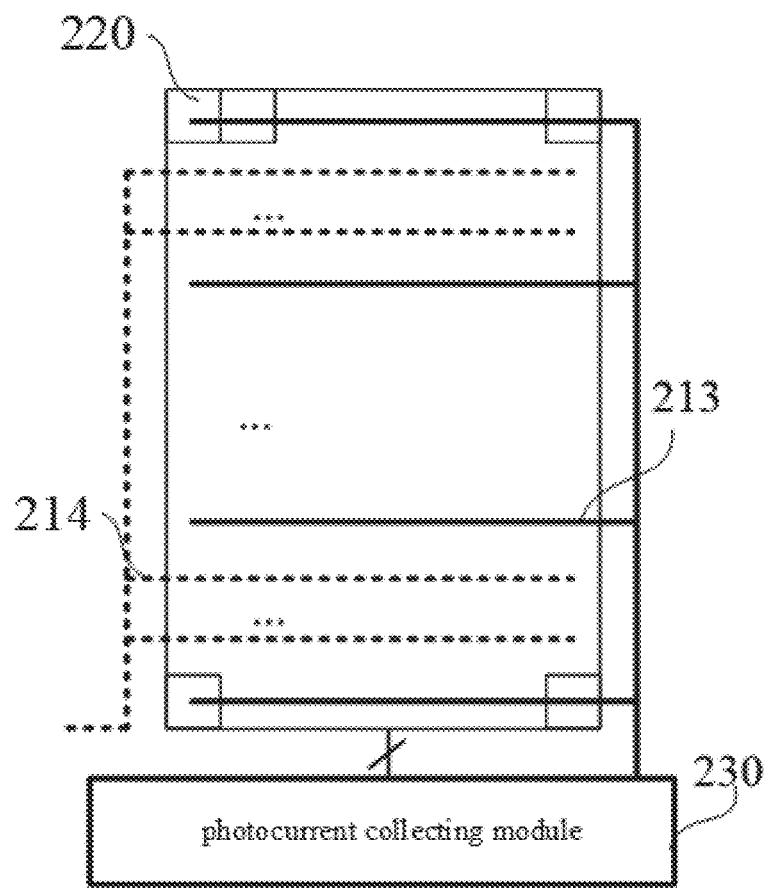
FIG. 8 is a diagram illustrating a local layout of a signal collecting circuit according to an exemplary embodiment of the present disclosure.

FIG. 8 is a diagram illustrating a local layout of a signal collecting circuit 200 according to an exemplary embodiment of the present disclosure. In some embodiments, referring to FIG. 8, the bias voltage wire 210 includes multiple first bias voltage wires 213 and multiple second bias voltage wires 214. At least part of the first bias voltage wires 213 and at least part of the second bias voltage wires 214 are interleaved, and output terminals of the first bias voltage wires 213 are connected to the photocurrent collecting module 230. Multiple fingerprint pixel circuits 220 are provided in multi-rows and multi-columns. In some rows of the fingerprint pixel circuits 220, the photoelectric conversion units 221 in each row of the fingerprint pixel circuits 220 are connected to one first bias voltage wire 213, and in other rows of fingerprint pixel circuits 220, the photoelectric conversion units 221 in each row of the fingerprint pixel circuits 220 are connected to one second bias voltage wire 214, or in some columns of the fingerprint pixel circuits 220, the photoelectric conversion units 221 in each column of the fingerprint pixel circuits 220 are connected to one first bias voltage wire 213, and in other columns of fingerprint pixel circuits 220, the photoelectric conversion units 221 in each column of the fingerprint pixel circuits 220 are connected to one second bias voltage wire 214. It is understandable that, the first bias voltage wires 213 and the second bias voltage wires 214 are provided alternately, or multiple first bias voltage wires 213 are provided in some row regions, and multiple first bias voltage wires 214 are provided in other row regions. The layout for columns is similar to the layout for rows, which will not be repeated here. Thus, the photocurrent collecting module 230 collects the photocurrent signals output by the photoelectric conversion units 221 of some rows or columns of the fingerprint pixel circuits 220 through the first bias voltage wires 213, rather than collect the photocurrent signals output by all the photoelectric conversion units 221, which reduces requirements for drive capability of the signal collecting circuit 200. The first bias voltage wires 213 and the second bias voltage wires 214 are interleaved, which may further determine an overall brightness of the display screen.

In some embodiments, referring to FIG. 3, each fingerprint pixel circuit 220 further includes a switch element 222 connected to the photoelectric conversion unit 221; the signal collecting circuit 200 further includes a drive module 240 connected to the switch element 222 and a fingerprint signal reading module 250 connected to the switch element 222, The drive module 240 is configured to drive the switch element 222 to turn on when detecting a fingerprint, to enable the fingerprint signal reading module 250 to read fingerprint signals collected by the photoelectric conversion units 221. Generally, multiple fingerprint pixel circuits 220 are provided in multi-rows and multi-columns. The drive module 240 drives multiple rows of the switch element 222 to turn on in sequence, so that the fingerprint signal reading module 250 reads the fingerprint signals collected by multiple rows of the fingerprint pixel circuit 220 in sequence.

Figure 9:
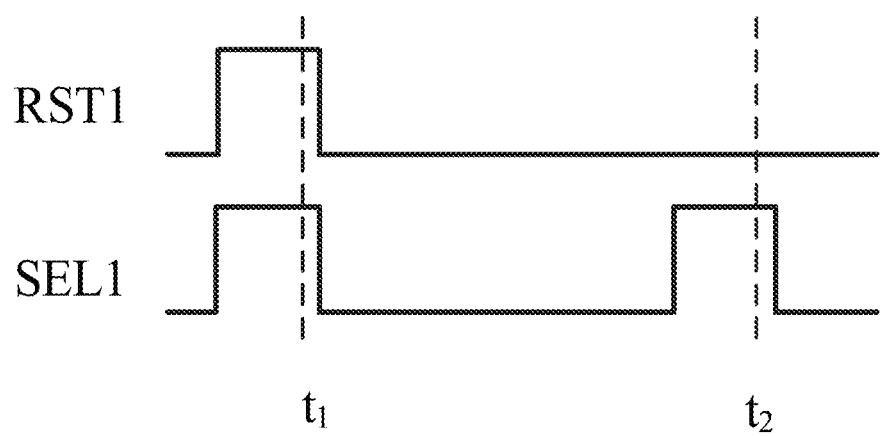
FIG. 9 is a diagram illustrating an operating sequence of a passive fingerprint pixel circuit according to an exemplary embodiment of the present disclosure.

As an example, the fingerprint signal reading module 250 may be integrated with the photocurrent collecting module 230. As an example, the switch element 222 may be a Thin Film Transistor (TFT), and the fingerprint pixel circuit 200 may include an active fingerprint pixel circuit or a passive fingerprint pixel circuit. Operating principle of the two type of fingerprint pixel circuits 220 are described in combination with the attached figures:

FIG. 9 is a diagram illustrating an operating sequence of a passive fingerprint pixel circuit 220 according to an exemplary embodiment of the present disclosure. The fingerprint pixel circuit 220 is a passive fingerprint pixel circuit 220. Referring to FIG. 2 or FIG. 3, each fingerprint pixel circuit 220 includes a first photosensitive diode PD1 and a first gating transistor SEL1 connected to the first photosensitive diode PD1, and the first gating transistor SEL1 is a switch element 222. When the drive module 240 drives the first gating transistor SEL1 to turn on, the fingerprint signal reading module 250 may read a first voltage signal of the first photosensitive diode PD1. Referring to FIG. 9, a reset is performed by a reset unit RST1 before a time point t1, the drive module 240 drives the first gating transistor SEL1 to turn on, and the fingerprint signal reading module 250 reads a voltage signal of the first photosensitive diode PD1 at the time point t1. Then, the drive module 240 drives the first gating transistor SEL1 to turn off, the first photosensitive diode PD1 accumulates a light signal and converts it into the photocurrent signal under exposure conditions, and the photocurrent signal may output to the bias voltage wire 210. The drive module 240 drives the first gating transistor SEL1 to turn on before a time point t2, and the fingerprint signal reading module 250 reads a second voltage signal of the first photosensitive diode PD1 at the time point t2, and determines a fingerprint signal based on a difference between the first voltage signal and the second voltage signal.

Figure 10:
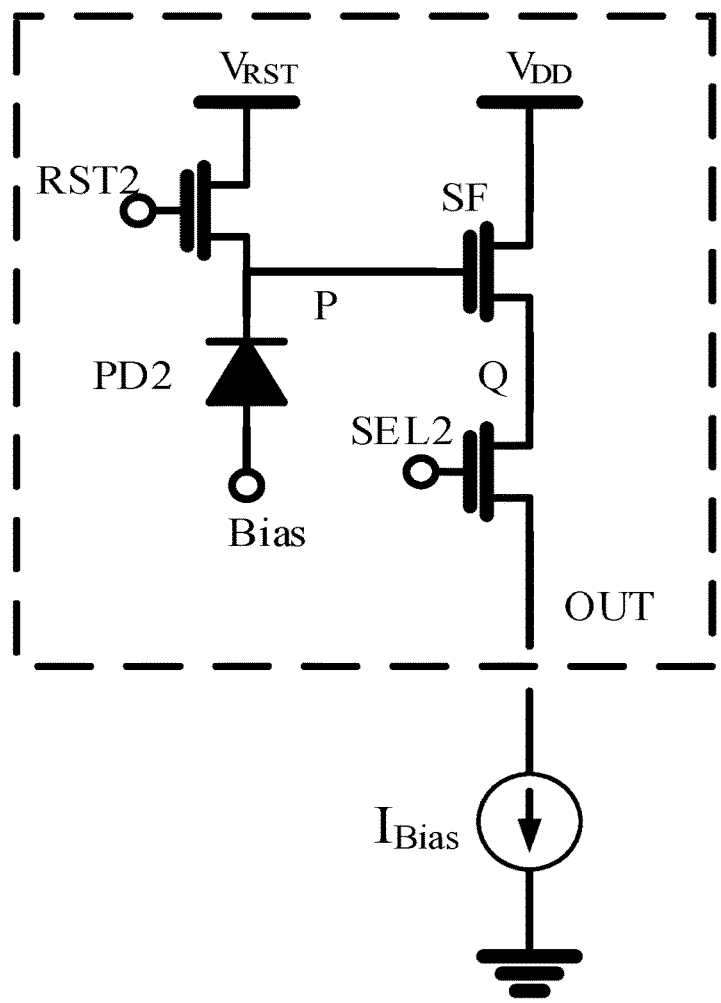
FIG. 10 is a diagram illustrating an active fingerprint pixel circuit according to an exemplary embodiment of the present disclosure.
Figure 11:
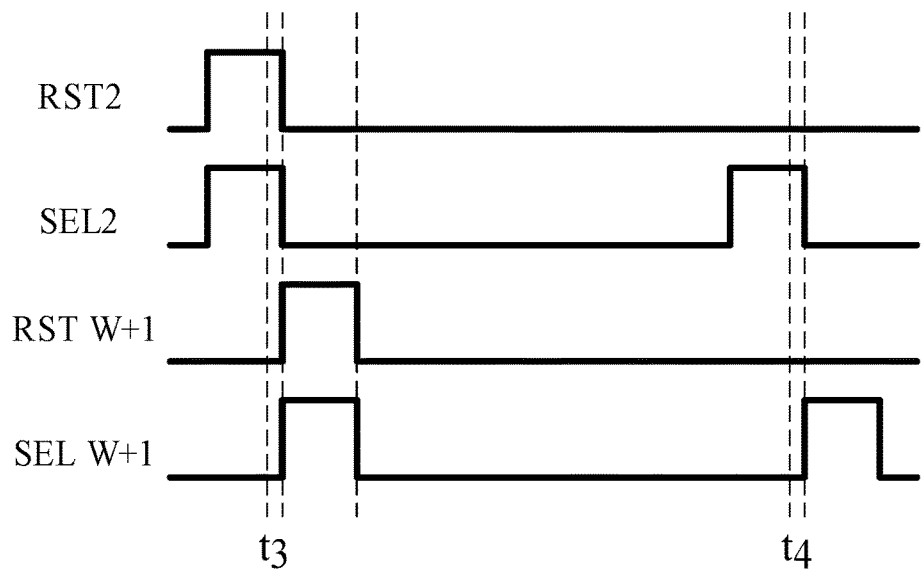
FIG. 11 is a diagram illustrating an operating sequence of an active fingerprint pixel circuit according to an exemplary embodiment of the present disclosure.

FIG. 10 is a diagram illustrating a circuit of an active fingerprint pixel circuit 220 according to an exemplary embodiment of the present disclosure, and FIG. 11 is a diagram illustrating an operating sequence of fan active fingerprint pixel circuit 220 according to exemplary embodiment of the present disclosure. The fingerprint pixel circuit 220 is the active fingerprint pixel circuit. Referring to FIG. 10, each fingerprint pixel circuit 220 includes a second photosensitive diode PD2, a reset transistor RST2, a source follower transistor SF, and a second gating transistor SEL2.

The second photosensitive diode PD2 is connected to the reset transistor RST2, one terminal of the source follower transistor SF is connected a second point between the reset transistor RST2 and the second photosensitive diode PD2, and the other terminal of the source follower transistor SF is connected to the second gating transistor SEL2. Referring to FIG. 10 and FIG. 11, before a time point t3, the drive module 240 controls the reset transistor RST2 to reset and controls the second gating transistor SEL2 to turn on, so that the IBias at the output terminal of the fingerprint pixel circuit sets a voltage through the second gating transistor SEL2 and an OUT point reflects a voltage at a P point. At the time point t3, the fingerprint signal reading module 250 reads a third voltage signal collected by the fingerprint pixel circuit 220. Then, the drive module 240 controls the second gating transistor SEL2 to turn off, and the second photosensitive diode PD2 exposes. Before a time point t4, the drive module 240 drives the second gating transistor SEL2 to turn on, so that the IBias at the output terminal of the fingerprint pixel circuit sets a voltage through the second gating transistor SEL2 and the OUT point reflects the voltage at the P point. At the time point t4, the fingerprint signal reading module 250 reads a fourth voltage signal collected by the fingerprint pixel circuit 220. A difference between the third voltage signal and the fourth voltage signal is a fingerprint signal. Operating principle of other rows of the fingerprint pixel circuits are similar, which will not be described in detail here.

Figure 12:
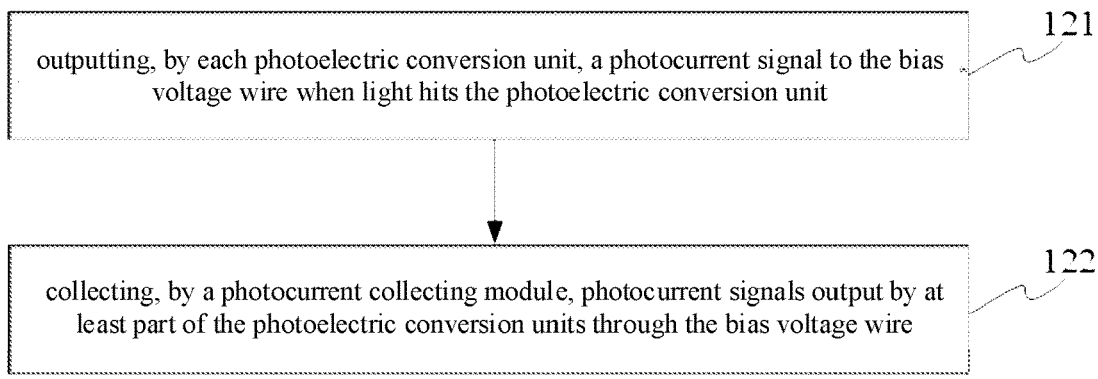
FIG. 12 is a flowchart illustrating a signal collecting method according to an exemplary embodiment of the present disclosure.

FIG. 12 is a flowchart illustrating a signal collecting method according to an exemplary embodiment of the present disclosure. A signal collecting method provided in some embodiments of the present disclosure is applied to a signal collecting circuit. The circuit includes a bias voltage wire, multiple fingerprint pixel circuits and a photocurrent collecting module, each of the fingerprint pixel circuits includes a photoelectric conversion unit, and the photoelectric conversion units and the photoelectric collecting module are connected to the bias voltage wire. Referring to FIG. 12, the method includes the following.

At block 121, a photocurrent signal is output to the bias voltage wire by each photoelectric conversion unit when light hits the photoelectric conversion unit. The photoelectric conversion unit forms the photocurrent signal when the light hits the photoelectric conversion unit. Since the voltage of the bias voltage wire is small, the photocurrent signal may be output to the bias voltage wire by the photoelectric conversion unit.

At block 122, photocurrent signals output by at least part of the photoelectric conversion units through the bias voltage wire are collected a photocurrent collecting module. As an example, the photocurrent collecting module may collect the photocurrent signals output by all photoelectric conversion units, and may collect the photocurrent signal outputs by a part of photoelectric conversion units.

In some embodiments, the photocurrent collecting module includes a power supply terminal, a feedback circuit, a voltage division circuit and a voltage regulator; the voltage regulator includes a control terminal, a first connection terminal and a second connection terminal, the control terminal is connected to the feedback circuit, the first connection terminal is connected to the power supply terminal, the second connection terminal is connected to the voltage division circuit, the voltage division circuit is connected to a grounding terminal and the feedback circuit, a bias voltage point between the second connection terminal and the feedback circuit is connected to the bias voltage wire. The signal collecting method provided in some embodiments of the present disclosure further includes: a voltage of the bias voltage point is divided by the voltage division circuit to obtain a feedback voltage; and a voltage regulating signal is output to the voltage regulator based on the feedback voltage through the feedback circuit, to enabled the voltage regulator to adjust a voltage at the second connection terminal.

In some embodiments, the voltage division circuit includes a first voltage division resistor and a second voltage division resistor connected in series. The first voltage division resistor is connected to the second connection terminal, and the second voltage division resistor is connected to the grounding terminal; one terminal of the feedback circuit is connected a first point between the first voltage division resistor and the second voltage division resistor; the photocurrent collecting module further includes a voltage detector. The signal collecting method provided in some embodiments of the present disclosure further includes detecting, by the voltage detector, a voltage of the second voltage division resistor. As an example, the voltage of the second voltage division resistor is detected twice by the voltage detector, and then a voltage difference may be obtained by other processing modules according to the voltages detected twice, and variation quantity of the photocurrent signal is determined according to the voltage difference, and then light intensity is determined according to the variation quantity of the photocurrent signal.

In some embodiments, each fingerprint pixel circuit further includes a switch element, which is connected to the photoelectric conversion unit; the signal collecting circuit further includes a drive module connected to the switch element and a fingerprint signal reading module connected to the switch element; when detecting a fingerprint, the switch element is drove, by the drive module, to turn on the fingerprint signal reading module and the photoelectric conversion unit, to enable the fingerprint signal reading module to read fingerprint signals collected by the photoelectric conversion units.

The signal collecting method provided in embodiments of the present disclosure may refer to related description of a signal collecting circuit, which will not be repeated here.

The signal collecting method provided in the embodiment of the present disclosure, the photocurrent signal is output, by the photoelectric conversion unit, to a bias voltage wire when the light hits the photoelectric conversion unit, and the photocurrent signals output by a part of the photoelectric conversion units through the bias voltage wire are collected by the photocurrent collecting module, and the light intensity is determine based on the photocurrent signals. In this way, the photoelectric conversion units of the fingerprint pixel circuit are multiplexed to detect the light intensity to improve the utilization rate of the fingerprint pixel circuit, thus an electronic device including the signal collecting circuit has a light intensity detection function and a fingerprint detection function, which is conducive to enhancing the market competitiveness of the electronic device. In addition, original hardware for detecting the light intensity in the electronic device may be omitted, and the fingerprint pixel circuit may be multiplexed to detect the light intensity, which is conducive to reducing cost of the electronic device.

Figure 13:
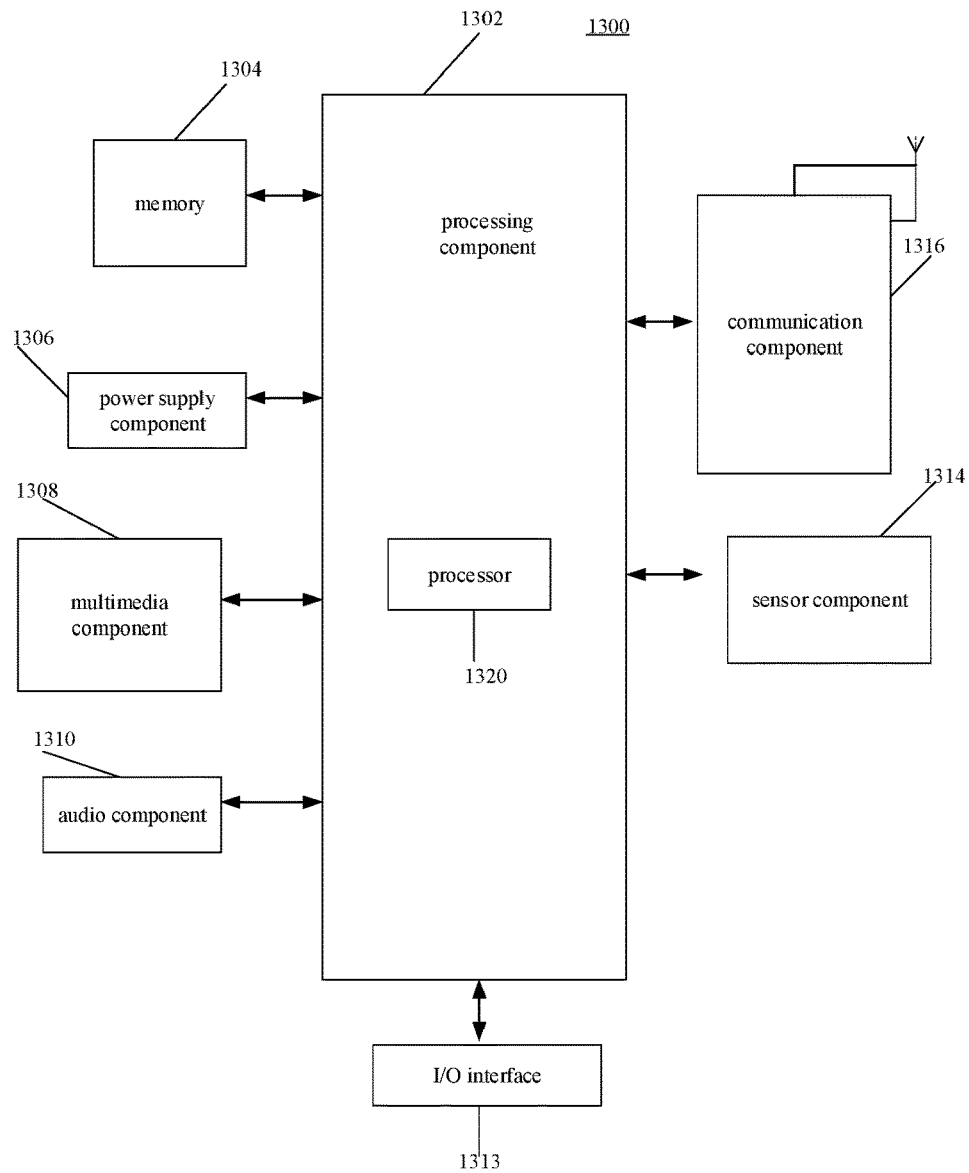
FIG. 13 is a block diagram illustrating an electronic device according to an exemplary embodiment of the present disclosure.

FIG. 13 is a block diagram illustrating an electronic device according to an exemplary embodiment of the present disclosure. For example, an electronic device 1300 may be a smart phone, a computer, a digital broadcasting terminal, a messaging device, a game console, a tablet device, a medical equipment, a fitness equipment, a personal digital assistant, etc. of a transmitting coil, a first magnetic sensor and a second magnetic sensor in the device adjusting a headset audio parameter.

Referring to FIG. 13, an electronic device 1300 may include one or more components: a processing component 1302, a memory 1304, a power supply component 1306, a multimedia component 1308, an audio component 1313, an input/output (I/O) interface 1312, a sensor component 1314, and a communication component 1316.

The processing component 1302 generally controls the whole operation of the device 1300, such as the operations related to display, phone call, data communication, camera operation and recording operation. The processing component 1302 may include one or more processors 1320 to execute instructions, to complete all or part of blocks of the above methods. In addition, the processing component 1302 may include one or more modules for the convenience of interaction between the processing component 1302 and other components. For example, the processing component 1302 may include a multimedia module for the convenience of interaction between the multimedia component 1308 and the processing component 1302.

The memory 1304 is configured to store all types of data to support the operation of the electronic device 1300. Examples of the data include the instructions of any applications or methods operated on the electronic device 1300, contact data, phone book data, messages, pictures, videos, etc. The memory 1304 may be implemented by any type of volatile or non-volatile storage devices or their combination, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), Magnetic Memory, Flash Memory, Magnetic Disk or Optical Disk.

The power supply component 1306 may provide power for all components of the electronic device 1300. The power supply component 1306 may include power supply management system, one or more power supplies, and other units related to generating, managing and distributing power for the electronic device 1300.

The multimedia component 1308 includes an output interface screen provided between the electronic device 1300 and the target object. In some embodiments, a screen may include a liquid crystal display (LCD) and a touch panel (TP). If the screen includes a touch panel, the screen may be implemented as a touch screen to receive an input signal from the target object. The touch panel includes one or more touch sensors to sense touching, sliding and gestures on the touch panel. The touch sensor may not only sense the boundary of touch or slide action, but also detect the duration and pressure related to the touching or sliding operation.

The audio component 1313 is configured as output and/or input signal. For example, the audio component 1313 includes a microphone (MIC). When the electronic device 1300 is in operation mode, such as call mode, record mode, and speech recognition mode, the microphone is configured to receive the external audio signals. The audio signals received may be further stored in the memory 1304 or sent via the communication component 1316. In some embodiments, the audio component 1310 further includes a speaker configured to an output audio signal.

The I/O interface 1312 provides an interface for the processing component 1302 and the peripheral interface module, and the peripheral interface module may be a keyboard, a click wheel, a button, etc.

The sensor component 1314 includes one or more sensors, configured to provide various aspects of status assessment for the electronic device 1300. For example, the sensor component 1314 may detect the on/off state of the electronic device 1300 and the relative positioning of the component. For example, the component is a display screen and a keypad of the electronic device 1300. The sensor component 1314 may further detect the location change of the electronic device 1300 or one component of the electronic device 1300, the presence or absence of contact between the user and the device 1300, the orientation or acceleration/deceleration of the device 1300, and the temperature change of the device 1300.

The communication component 1316 is configured for the convenience of wire or wireless communication between the electronic device 1300 and other devices. The electronic device 1300 may access wireless networks based on communication standard, such as WiFi, 2G or 3G, or their combination. In an exemplary embodiment, the communication component 1316 receives broadcast signals or broadcast-related information from an external broadcast management system via a broadcast channel. In an exemplary embodiment, the communication component 1316 further includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an exemplary embodiment, the electronic device 1300 may be implemented by one or more application specific integrated circuits(ASIC), digital signal processors (DSP), digital signal processing devices (DSPD), programmable logic devices (PLD), field programmable gate arrays (FPGA), controllers, microcontrollers, microprocessors or other electronics components.

In an exemplary embodiment, a computer readable storage medium with a program thereon is further provided, and when the program is executed by the processor 1320, one of the above signal collecting method may be implemented. In which, a computer readable storage medium may be a ROM, a random access memory (RAM), a CD-ROM, a magnetic tape, a floppy disk, an optical data storage device, etc.

The embodiments of the method refer to part descriptions of embodiments of the apparatus since it corresponds to the embodiments of the apparatus. The embodiments of the method are supplementary with the embodiments of the apparatus.

The above embodiments of the present disclosure may be complementary with each other without conflict.

The above are only some embodiments in embodiments of the present disclosure, and do not constitute the limitation of the present disclosure. Any modification, equivalent replacement, improvement, etc., made within the spirit and principle of embodiments of the present disclosure shall be included within the protection scope of embodiments of the present disclosure.

What is claimed is:

1. A signal collecting circuit, comprising:
   a bias voltage wire;
   a plurality of fingerprint pixel circuits, each fingerprint pixel circuit comprising a photoelectric convertor, connected to the bias voltage wire and configured to output a photocurrent signal to the bias voltage wire when light hits the photoelectric convertor, wherein, the bias voltage wire is configured to provide a bias voltage for the photoelectric convertor; and a photocurrent collector, connected to the bias voltage wire and configured to collect the photocurrent signals output by at least part of the photoelectric convertors through the bias voltage wire, wherein, the photocurrent signals configured to determine a light intensity.

2. The circuit of claim 1, wherein, the photocurrent collector comprises a power supply terminal, a feedback circuit, a voltage division circuit and a voltage regulator, wherein, the voltage regulator comprises a control terminal, a first connection terminal and a second connection terminal, wherein the control terminal is connected to the feedback circuit, the first connection terminal is connected to the power supply terminal, the second connection terminal is connected to the voltage division circuit, the voltage division circuit is connected to a grounding terminal and the feedback circuit, and a bias voltage point between the second connection terminal and the voltage division circuit is connected to the bias voltage wire;

the voltage division circuit is configured to divide a voltage at the bias voltage point to obtain a feedback voltage, and the feedback circuit is configured to output a voltage regulating signal to the voltage regulator based on the feedback voltage to enable the voltage regulator to adjust a voltage at the second connection terminal.

3. The circuit of claim 2, wherein, the voltage division circuit comprises a first voltage division resistor and a second voltage division resistor connected in series, and the first voltage division resistor is connected to the second connection terminal, and the second voltage division resistor is connected to the grounding terminal;

one terminal of the feedback circuit is connected a first point between the first voltage division resistor and the second voltage division resistor.

4. The circuit of claim 3, wherein, the photocurrent collector further comprises a first reference voltage terminal, the feedback circuit comprises a first operational amplifier, and the first operational amplifier comprises a first input terminal, a second input terminal and a first output terminal, and the first input terminal is connected to the first reference voltage terminal, the second input terminal is connected the first point between the first voltage division resistor and the second voltage division resistor, and the first output terminal is connected to the control terminal.

5. The circuit of claim 3, wherein, the photocurrent collector comprises a voltage detector, configured to detect a voltage of the second voltage division resistor.

6. The circuit of claim 2, wherein, the voltage regulator comprises a transistor, and the transistor comprises a grid, the first connection terminal and the second connection terminal, and the grid is connected to the feedback circuit.

7. The circuit of claim 1, wherein, the photocurrent collector comprises a second operational amplifier, a feedback capacitor and a second reference voltage terminal;

the second operational amplifier comprises a third input terminal, a fourth input terminal and a second output terminal, wherein the third input terminal is connected to the second reference voltage terminal, the fourth input terminal is connected to an output terminal of the bias voltage wire, one terminal of the feedback capacitor is connected to the fourth input terminal and the other terminal of the feedback capacitor is connected to the second output terminal.

8. The circuit of claim 1, wherein, the bias voltage wire comprises a plurality of bias voltage branches and a bias voltage bus, an output terminal of each bias voltage branch is connected to an input terminal of the bias voltage bus, an output terminal of the bias voltage bus is connected to the photocurrent collector, and the plurality of fingerprint pixel circuits are provided in multi-rows and multi-columns;

the photoelectric convertors in each row of the fingerprint pixel circuits are connected to an input terminal of one bias voltage branch, or the photoelectric convertors in each column of the fingerprint pixel circuits are connected to the input terminal of one bias voltage branch.

9. The circuit of claim 1, wherein, the bias voltage wire comprises a plurality of first bias voltage wires and a plurality of second bias voltage wires, at least part of the first bias voltage wires and at least part of the second bias voltage wires are interleaved, output terminals of the first bias voltage wires are connected to the photocurrent collector, and multiple fingerprint pixel circuits are provided in multi-rows and multi-columns;

in some rows of the fingerprint pixel circuits, the photoelectric convertors in each row of the fingerprint pixel circuits are connected to one first bias voltage wire, and in other rows of fingerprint pixel circuits, the photoelectric convertors in each row of the fingerprint pixel circuits are connected to one second bias voltage wire, or in some columns of the fingerprint pixel circuits, the photoelectric convertors in each column of the fingerprint pixel circuits are connected to one first bias voltage wire, and in other columns of fingerprint pixel circuits, the photoelectric convertors in each column of the fingerprint pixel circuits are connected to one second bias voltage wire.

10. The circuit of claim 1, wherein, each fingerprint pixel circuit further comprises a switch element connected to the photoelectric convertor;

the signal collecting circuit further comprises: a drive module connected to the switch element and a fingerprint signal reading module connected to the switch element, the drive module is configured to drive the switch element to turn on when detecting a fingerprint, to enable the fingerprint signal reading module to read fingerprint signals collected by the photoelectric convertors.

11. A signal collecting method, applied to a signal collecting circuit, and comprises:

outputting, by each photoelectric convertor connected to a bias voltage wire, a photocurrent signal to the bias voltage wire when light hits the photoelectric convertor, wherein, the bias voltage wire is configured to provide a bias voltage for the photoelectric convertor;

collecting, by a photocurrent collector connected to the bias voltage wire, photocurrent signals output by at least part of photoelectric convertors through the bias voltage wire, wherein, the photocurrent signals configured to determine a light intensity.

12. The method of claim 11, wherein, the photocurrent collector comprises a power supply terminal, a feedback circuit, a voltage division circuit and a voltage regulator; the voltage regulator comprises a control terminal, a first connection terminal and a second connection terminal, wherein the control terminal is connected to the feedback circuit, the first connection terminal is connected to the power supply terminal, the second connection terminal is connected to the voltage division circuit, the voltage division circuit is connected to a grounding terminal and the feedback circuit, and a bias voltage point between the second connection terminal and the voltage division circuit is connected to the bias voltage wire, and the method further comprises:

dividing, by the voltage division circuit, a voltage at the bias voltage point to obtain a feedback voltage;

outputting, by the feedback circuit, a voltage regulating signal to the voltage regulator based on the feedback voltage, to enable the voltage regulator to adjust a voltage at the second connection terminal.

13. The method of claim 12, wherein, the voltage division circuit comprises a first voltage division resistor and a second voltage division resistor connected in series, the first voltage division resistor is connected to the second connection terminal, and the second voltage division resistor is connected to the grounding terminal; one terminal of the feedback circuit is connected a first point between the first voltage division resistor and the second voltage division resistor; the photocurrent collector further comprises a voltage detector, and the method further comprises:

detecting, by the voltage detector, a voltage of the second voltage division resistor.

14. The method of claim 11, wherein, each fingerprint pixel circuit further comprises a switch element connected to the photoelectric convertor; the signal collecting circuit further comprises a drive module connected to the switch element and a fingerprint signal reading module connected to the switch element, and the method further comprises:

when detecting a fingerprint, driving, by the drive module, the switch element to turn on the fingerprint signal reading module and the photoelectric convertor, to enable the fingerprint signal reading module to read fingerprint signals collected by the photoelectric convertors.

15. An electronic device, comprising a display screen and a signal collecting circuit, wherein the signal collecting circuit comprises:

a bias voltage wire;

a plurality of fingerprint pixel circuits, each fingerprint pixel circuit comprising a photoelectric convertor, connected to the bias voltage wire and configured to output a photocurrent signal to the bias voltage wire when light hits the photoelectric convertor, wherein, the bias voltage wire is configured to provide a bias voltage for the photoelectric convertor; and a photocurrent collector, connected to the bias voltage wire and configured to collect the photocurrent signals output by at least part of the photoelectric convertors through the bias voltage wire, wherein, the photocurrent signals configured to determine a light intensity.

16. The electronic device of claim 15, wherein the signal collecting circuit is provided on a back of the display screen.

17. The electronic device of claim 15, the photocurrent collector comprises a power supply terminal, a feedback circuit, a voltage division circuit and a voltage regulator, wherein, the voltage regulator comprises a control terminal, a first connection terminal and a second connection terminal, wherein the control terminal is connected to the feedback circuit, the first connection terminal is connected to the power supply terminal, the second connection terminal is connected to the voltage division circuit, the voltage division circuit is connected to a grounding terminal and the feedback circuit, and a bias voltage point between the second connection terminal and the voltage division circuit is connected to the bias voltage wire;

the voltage division circuit is configured to divide a voltage at the bias voltage point to obtain a feedback voltage, and the feedback circuit is configured to output a voltage regulating signal to the voltage regulator based on the feedback voltage to enable the voltage regulator to adjust a voltage at the second connection terminal.

18. The electronic device of claim 15, wherein, the photocurrent collector comprises a second operational amplifier, a feedback capacitor and a second reference voltage terminal;

the second operational amplifier comprises a third input terminal, a fourth input terminal and a second output terminal, wherein the third input terminal is connected to the second reference voltage terminal, the fourth input terminal is connected to an output terminal of the bias voltage wire, one terminal of the feedback capacitor is connected to the fourth input terminal and the other terminal of the feedback capacitor is connected to the second output terminal.

19. The electronic device of claim 15, wherein, the bias voltage wire comprises a plurality of bias voltage branches and a bias voltage bus, an output terminal of each bias voltage branch is connected to an input terminal of the bias voltage bus, an output terminal of the bias voltage bus is connected to the photocurrent collector, and the plurality of fingerprint pixel circuits are provided in multi-rows and multi-columns;

the photoelectric convertors in each row of the fingerprint pixel circuits are connected to an input terminal of one bias voltage branch, or the photoelectric convertors in each column of the fingerprint pixel circuits are connected to the input terminal of one bias voltage branch.

20. The electronic device of claim 15, wherein, the bias voltage wire comprises a plurality of first bias voltage wires and a plurality of second bias voltage wires, at least part of the first bias voltage wires and at least part of the second bias voltage wires are interleaved, output terminals of the first bias voltage wires are connected to the photocurrent collector, and multiple fingerprint pixel circuits are provided in multi-rows and multi-columns;

in some rows of the fingerprint pixel circuits, the photoelectric convertors in each row of the fingerprint pixel circuits are connected to one first bias voltage wire, and in other rows of fingerprint pixel circuits, the photoelectric convertors in each row of the fingerprint pixel circuits are connected to one second bias voltage wire, or in some columns of the fingerprint pixel circuits, the photoelectric convertors in each column of the fingerprint pixel circuits are connected to one first bias voltage wire, and in other columns of fingerprint pixel circuits, the photoelectric convertors in each column of the fingerprint pixel circuits are connected to one second bias voltage wire.

* * * * *